Oct. 24, 1950    R. L. WOLD    2,527,047
IRRIGATION SYSTEM
Filed March 21, 1947    3 Sheets-Sheet 1

RUSSELL L. WOLD
*INVENTOR.*

BY James H. Littlepage

Oct. 24, 1950   R. L. WOLD   2,527,047
IRRIGATION SYSTEM

Filed March 21, 1947   3 Sheets-Sheet 2

RUSSELL L. WOLD
*INVENTOR.*

BY James H. Littlepage

Oct. 24, 1950     R. L. WOLD     2,527,047
IRRIGATION SYSTEM

Filed March 21, 1947     3 Sheets-Sheet 3

RUSSELL L. WOLD
*INVENTOR.*

BY James H. Littlepage

Patented Oct. 24, 1950

2,527,047

UNITED STATES PATENT OFFICE 2,527,047

IRRIGATION SYSTEM

Russell L. Wold, Lihue, Kauai, Territory of Hawaii

Application March 21, 1947, Serial No. 736,197

9 Claims. (Cl. 61—12)

This invention relates to irrigation methods and apparatus and, more particularly, to a method of dispensing flume water and flume and scoop system for delivering water from a flume to an adjacent furrow.

The object of the invention is to provide a system wherein a conduit of flume sections extends bridge-like from row to row transversely over the furrows to be irrigated, and wherein desired amounts of water are delivered through the bottom of the flume to each furrow. Most particularly, it is intended that the water passing over an opening in the bottom of a flume be scooped off and delivered downwardly towards the furrow in positively controlled streams. Additionally, it is intended to provide for the swirling of the scooped-off amounts of water so that the energy thereof is dissipated, the water thereafter being dropped relatively quietly to the ground rather than be discharged in a strong, erosive stream.

Another object of the invention is the provision of a flume, preferably formed of suitable sheet material, and having a series of discharge openings spaced along the length thereof, the openings being in the flume bottom so that the passing flume stream may be deflected downwardly for discharge through the openings. In this manner it is intended that deflectors may be placed at will in any one of the bottom openings for discharging water at the desired locations along the length of the flume. In order to prevent leakage through the unused bottom openings, it is intended that the bottom of the flume be provided with an upstanding blister immediately upstream of each bottom opening so that the flume stream will normally be deflected up and over the bottom opening, and will not pass downwardly through the opening unless a scoop or the like deflecting element is positioned in the flume stream to deflect some of the passing water downwardly through the opening.

Yet another object is to provide a delivery scoop having a deflector adapted to project upwardly through an opening in a flume bottom, and so arranged that the angle of the deflector may be selectively maintained, and so that the effective extent of the deflector may be selected, thus to control the amount of water thereby deflected downwardly through the flume opening. It is also intended to provide for the easy attachment, detachment of the scoop.

These and other objects will be apparent from the following specification and drawings, in which.

Referring now to the drawings, like reference numerals denote similar elements, prime numerals being used to denote modification of the elements previously described.

In all the embodiments shown in Figs. 1 to 11, inclusive, water is delivered through an opening in the bottom of a flume 2, 2', or 2" to an open-ended cross-pipe supported therebelow, it being understood that the flume is sloped so that water flows rapidly in the direction of the arrow, and that the flume extends bridge-like over the furrows 4 to be irrigated, the furrows themselves being sloped lengthwise. A grade of about three percent along the length of the flume will result in sufficient velocity in the flow of flume water for operation of this system.

Figure 1:
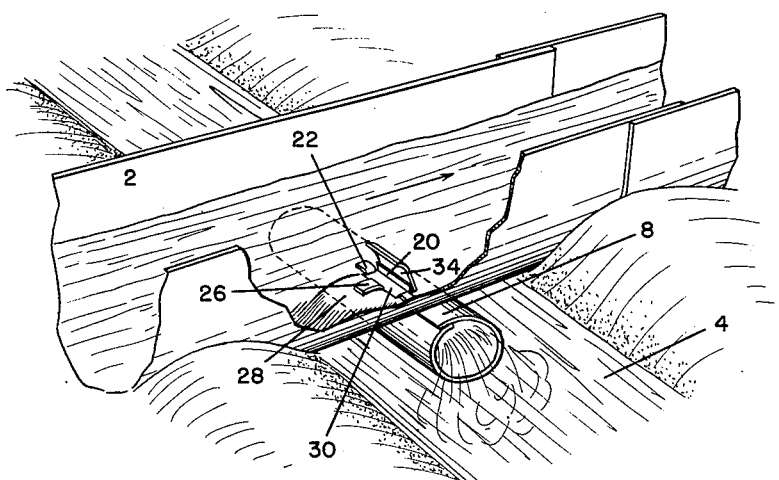
Fig. 1 is a perspective view, partially broken away, illustrating one form of the invention.
Figure 2:
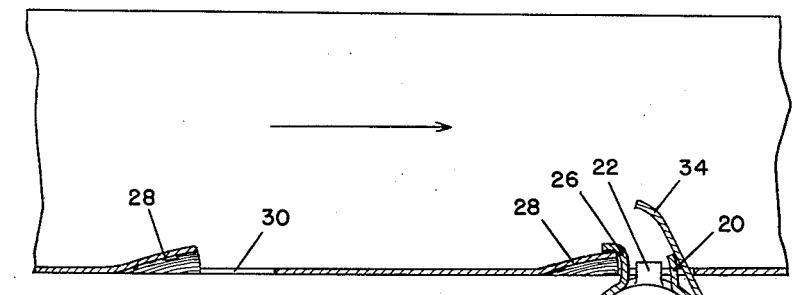
Fig. 2 is a vertical, longitudinal section taken along the center of the structure shown in Fig. 1, but with the showing of adjacent terrain removed.
Figure 3:
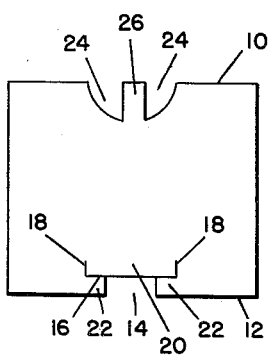
Fig. 3 is a plan view of a blank from which the body 8 is formed.

The embodiment illustrated in Figs. 1 and 2 is preferably made from a generally rectangular blank 6 as shown in Fig. 3 and includes an open-ended cylindrical body 8 formed by securing the upper and lower longitudinal edges 10 and 12 of the blank together. Lower edge 12 is cut away at 14 and slit at 16, 18 so as to leave a tongue 20, which forms a wedge or clamp for the sliding shaver 34 and tabs 22, 22. Upper edge 10 is cut away at 24, 24 on each side of a prong 26.

The bottom of flume section 2 is formed with upwardly projecting blisters 28 bumped therein at spaced intervals, and with openings 30 immediately downstream of the upper, rear edges of the blisters. Tube 8 is supported beneath flume 2 by bending prong 26 forwardly over the free, rear edge of a blister 28, and by bending tabs 22 over the side edges of flume opening 30 so that an opening 32 then defined by rear face of prong 26 and tongue 20 registers with flume opening 30. Tongue 20 then extends up into the flume so that a vane shaver 34 may be frictionally engaged between the rear of tongue 20 and the rear edge of opening 30. Shaver 34 is thus adjustable to deflect water down into tube body 8, from the open ends of which it is delivered to the furrow 4.

When it is desired to install scoops beneath only certain ones of openings 30, the others may be left open, since blisters 28 deflect most of the flume stream up and over openings 30 so that only negligible leakage therethrough occurs.

Figure 4:
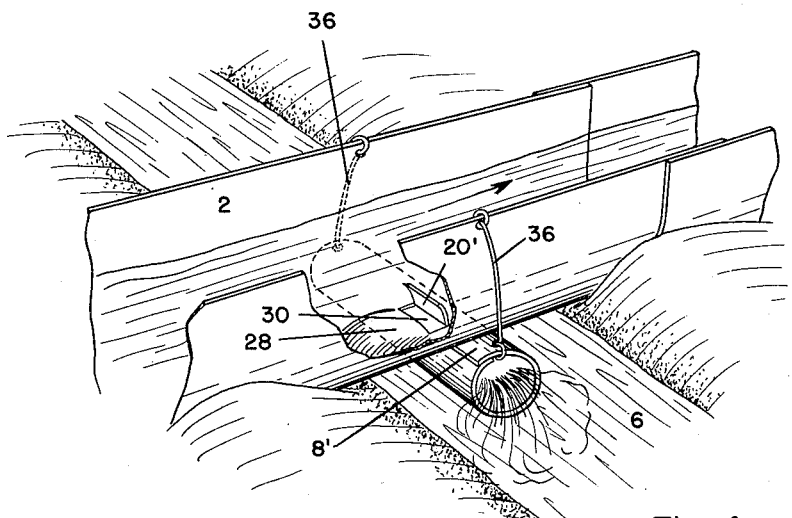
Figs. 4, 5 and 6 are views similar to Figs. 1, 2, and 3, respectively, but illustrating a second embodiment of the invention.
Figure 5:
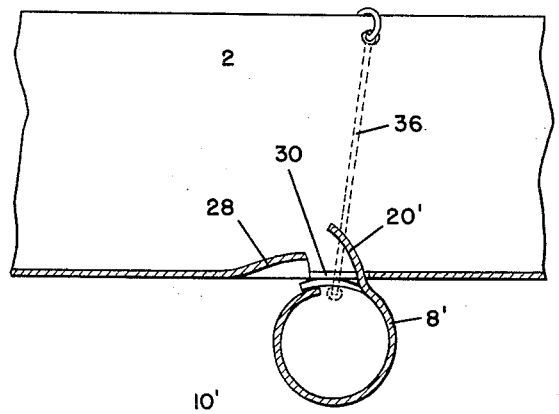
Figure 6:
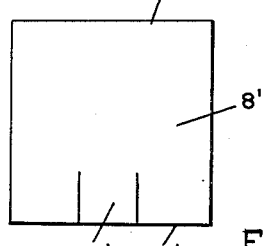
Figure 7:
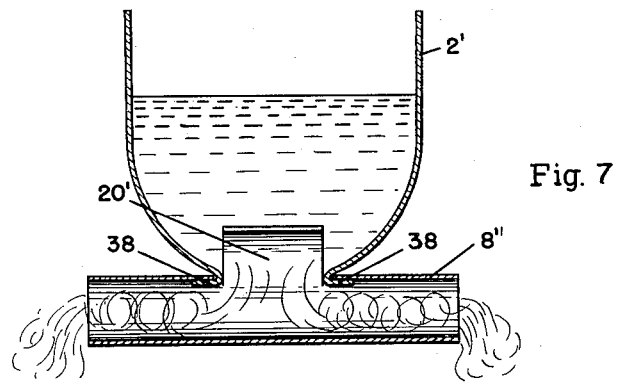
Fig. 7 is a transverse, vertical sectional view of a scoop similar to that shown in Figs. 4 to 6, inclusive, but illustrating a different arrangement of attachment to a flume.
Figure 8:
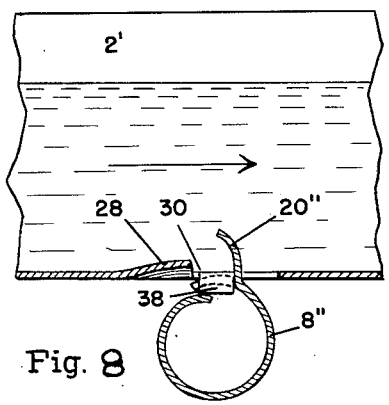
Fig. 8 is a vertical, longitudinal section of the scoop shown in Fig. 7.
Figure 9:
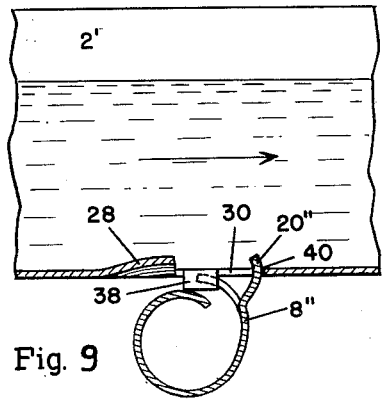
Fig. 9 is another view of the Figs. 7 and 8 embodiment, but illustrating the scoop in non-operating position; and, Figs. 10 and 11 are vertical, longitudinal sections of a scoop similar to that shown in Figs. 7 to 9, inclusive, but illustrating still another arrangement of attachment to and adjustment on a flume.
Figure 10:
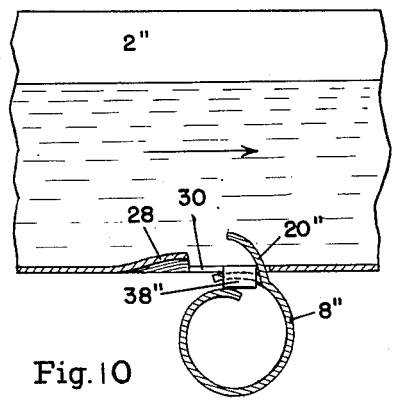
Figure 11:
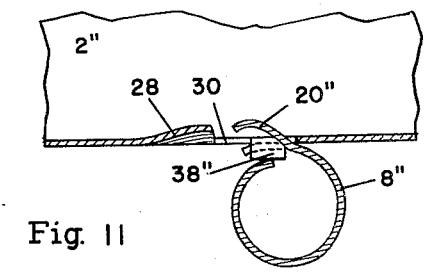

A modification of the bottom delivery scoop is illustrated in Figs. 4 and 5 wherein tubular cross pipe 8' is formed of a blank as shown in Fig. 6 without supporting prongs or tabs, but is supported beneath the flume by stiff wires 36 passing through suitable openings in tube 8' and flume 2. Tongue 20', which functions as a shaving vane is adjusted vertically, by extending or shortening wires 36 so as to lower or raise the pipe and tongue together.

In Figs. 7 to 11 inclusive, the cross-pipe 8" is supported by tabs 38, 38' or 38" struck from the bottom of flume 2' or 2". Where the tabs 38 are near the front of opening 30, as in Figs. 7 to 19, inclusive, tongue 20' is effectively withdrawn by clockwise rotation of tube 8" and where tabs 38' are near the rear of opening 30, as in Figs. 10 and 11, tongue 20" is withdrawn by counterclockwise rotation of tube 8".

While the specific apparatus may partake of various forms, three features predominate. They are, first, the deflection of a flume stream through an opening in a flume wall so that an increased and a controlled amount of flume water is dispensed through the opening; second, the deflection of the flume stream over a permanent opening in a flume wall so that unless the stream is additionally deflected through the opening, no substantial leakage occurs through the opening; and, third, the combination of the first two features.

The invention is not limited to the specific method and apparatus shown, but encompasses all substitutions, and modifications, and all auxiliary or alternative expedients within the scope of the following claims.

I claim:

1. The method of dispensing water through an opening in a flume, which comprises, passing a stream of flume water rapidly down the flume, deflecting the passing water bridge-like over and across said opening from the up stream side thereof, and deflecting a portion of the bridging water through said opening.

2. The method of dispensing water through an opening in a flume, which comprises, passing a stream of water rapidly down the flume, deflecting the passing water bridge-like over said opening from upstream to downstream thereof, and interposing a deflector inwardly through said opening into the bridging water to deflect a portion of the same outwardly through said opening.

3. The method of dispensing water through an opening in a flume, which comprises, passing a stream of water rapidly down the flume, deflecting the passing water bridge-like over said opening from upstream to downstream thereof, interposing a deflector inwardly through said opening into the bridging water to deflect a portion of the same outwardly through said opening, swirling the outwardly deflected water, and discharging the swirled water to the ground.

4. In combination, a flume adapted to contain a stream of water and having an opening in the wall thereof, a scoop including a baffle projecting through said opening for deflecting water through said opening, means removably mounting said scoop on said flume, and deflecting means on the wall of said flume on the upstream side of said opening for deflecting said stream over said opening.

5. The combination claimed in claim 4, said deflecting means comprising a blister in the wall of said flume.

6. In combination, a sheet-metal flume member adapted to contain a stream of water and having an opening in the bottom thereof, a sheet metal, open ended tube member having an opening in the side wall thereof, the tube member being disposed transversely beneath the flume member with the openings in registry, baffle means projecting upwardly through the opening in the flume member on the downstream side thereof for deflecting water through said openings, and means for holding said tube member on said flume member comprising tabs on one of said members adjacent the opening therein, said tabs being bendable around edges of the opening in the other member.

7. In an irrigation system, a flume having an opening in the bottom thereof, means adjacent the upstream side of said opening for deflecting the flume stream bridge-like across said opening, and means for deflecting the bridging water outwardly through said opening.

8. In an irrigation system, a flume having a sheet metal wall adapted to carry a stream of water and having upstream and downstream ends, said flume having an opening through said wall, the metal forming said wall being bent inwardly of said flume on the upstream side of and adjacent said opening, whereby to deflect said stream of water inwardly from said wall so as to bypass said opening.

9. The combination claimed in claim 8, the inwardly bent portion of said flume wall comprising a curved blister rising upwardly from said flume wall at its upper end and terminating at the upstream edge of said opening.

RUSSELL L. WOLD.

REFERENCES CITED

The following references are of record in the file of this patent:

UNITED STATES PATENTS

| Number | Name | Date |
|---|---|---|
| Re. 14,081 | Linxweiler | Mar. 7, 1916 |
| 679,965 | Von Holdt | Aug. 6, 1901 |
| 2,003,730 | Baldwin | June 4, 1935 |